US012666179B2

(12) United States Patent
Livoti et al.

(10) Patent No.: US 12,666,179 B2
(45) Date of Patent: Jun. 23, 2026

(54) AUDIENCE MONITORING SYSTEMS AND RELATED METHODS

(71) Applicant: The Nielsen Company (US), LLC, New York, NY (US)

(72) Inventors: John T. Livoti, Clearwater, FL (US); Stanley Wellington Woodruff, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 170 days.

(21) Appl. No.: 18/794,352

(22) Filed: Aug. 5, 2024

(65) Prior Publication Data

US 2024/0397242 A1 Nov. 28, 2024

Related U.S. Application Data

(63) Continuation of application No. 18/327,208, filed on Jun. 1, 2023, now Pat. No. 12,063,463, which is a continuation of application No. 17/175,354, filed on Feb. 12, 2021, now Pat. No. 11,711,638.

(60) Provisional application No. 63/045,507, filed on Jun. 29, 2020.

(51) Int. Cl.
*H04Q 9/00* (2006.01)
*H04R 1/08* (2006.01)
*H04W 4/02* (2018.01)

(52) U.S. Cl.
CPC .................. *H04Q 9/00* (2013.01); *H04R 1/08* (2013.01); *H04W 4/023* (2013.01); *H04Q 2209/40* (2013.01); *H04Q 2209/50* (2013.01)

(58) Field of Classification Search
CPC ............ H04Q 9/00; H04R 1/08; H04W 4/023
See application file for complete search history.

(56) References Cited

U.S. PATENT DOCUMENTS

| | | | |
|---|---|---|---|
| 7,433,696 B2 | 10/2008 | Dietrich et al. | |
| 9,696,336 B2 * | 7/2017 | Jain ......................... | G01P 15/18 |
| 9,955,359 B2 * | 4/2018 | Monaghan ............ | H04W 4/025 |
| 2005/0136845 A1 | 6/2005 | Masuoka et al. | |
| 2009/0070797 A1 * | 3/2009 | Ramaswamy ..... | H04N 21/4524 |
| | | | 725/10 |
| 2010/0066503 A1 | 3/2010 | Rhie et al. | |
| 2010/0109864 A1 | 5/2010 | Haartsen et al. | |
| 2012/0088519 A1 | 4/2012 | Agardh et al. | |
| 2020/0228924 A1 | 7/2020 | Lelkens et al. | |
| 2021/0409844 A1 | 12/2021 | Livoti et al. | |

OTHER PUBLICATIONS

United States Patent and Trademark Office, Non-Final office action, issued in connection with U.S. Appl. No. 17/566,451, mailed on Jul. 3, 2024, 15 pages.

* cited by examiner

*Primary Examiner* — Olisa Anwah

(57) ABSTRACT

Audience monitoring systems and related methods are described herein. An example audience monitoring system includes a beacon to be disposed proximate a media presentation device. The beacon is to transmit a ping signal. The system also includes a portable metering device to be carried by a person. The portable metering device includes a microphone to receive an audio signal and a processor to determine a distance value indicative of a distance between the portable metering device and the beacon based on the ping signal.

20 Claims, 7 Drawing Sheets

400

401 — IDENTIFY AUDIO SIGNALS

402 — GENERATE SIGNATURES FROM THE AUDIO SIGNALS

403 — IDENTIFY CODES IN THE AUDIO SIGNALS

404 — DETERMINE POWER LEVELS OF THE AUDIO SIGNALS

406 — TRANSMIT REQUEST PING SIGNAL

408 — DETERMINE DISTANCE VALUES ASSOCIATED WITH SURROUNDING DEVICES

410 — CORRELATE ONE OR MORE OF THE AUDIO SIGNALS WITH ONE OR MORE DEVICES

412 — TRANSMIT INFORMATION TO COLLECTION FACILITY

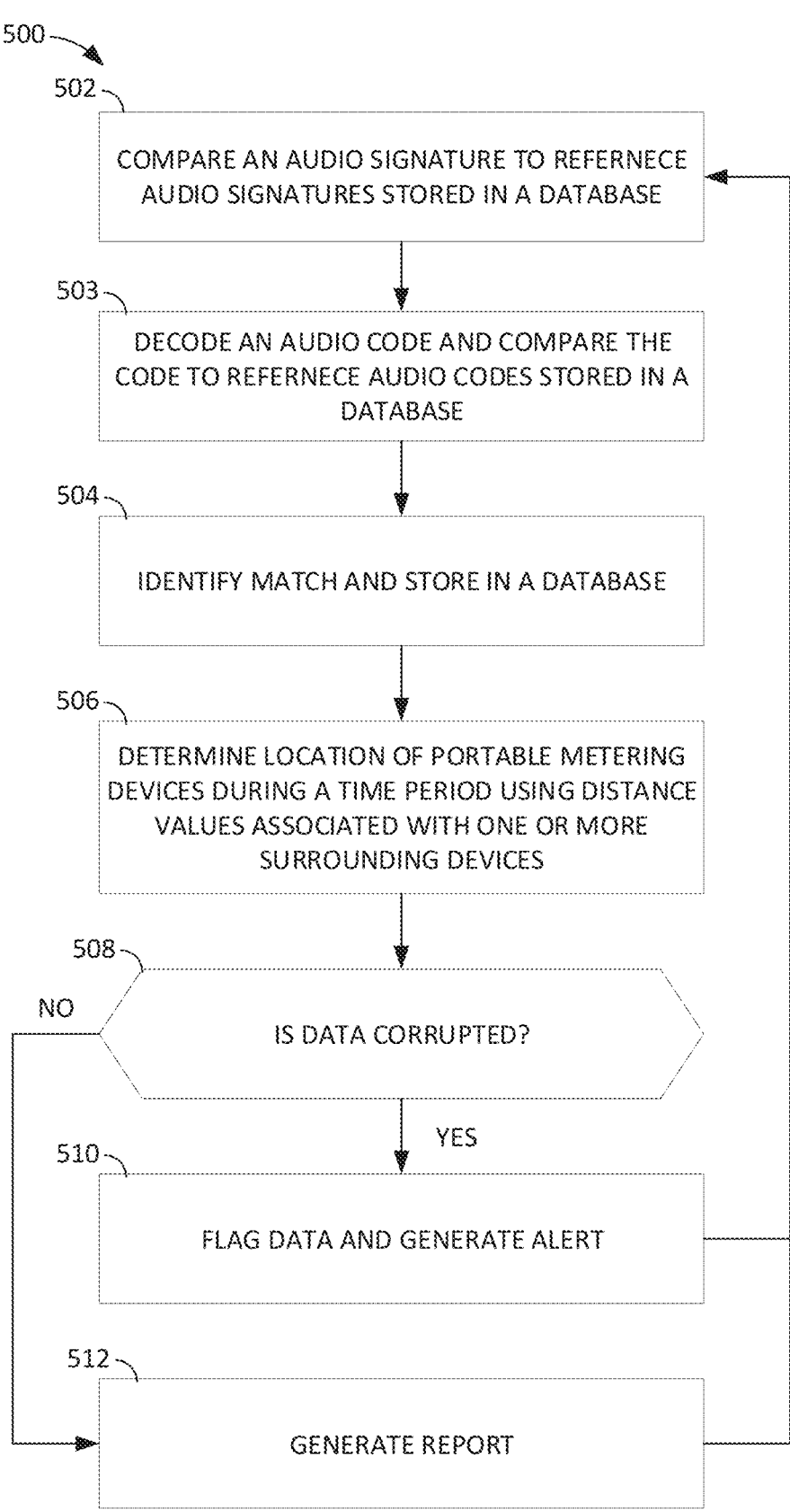

500

502
COMPARE AN AUDIO SIGNATURE TO REFERNECE AUDIO SIGNATURES STORED IN A DATABASE

503
DECODE AN AUDIO CODE AND COMPARE THE CODE TO REFERNECE AUDIO CODES STORED IN A DATABASE

504
IDENTIFY MATCH AND STORE IN A DATABASE

506
DETERMINE LOCATION OF PORTABLE METERING DEVICES DURING A TIME PERIOD USING DISTANCE VALUES ASSOCIATED WITH ONE OR MORE SURROUNDING DEVICES

508
IS DATA CORRUPTED?

NO

YES

510
FLAG DATA AND GENERATE ALERT

512
GENERATE REPORT

FIG. 5

AUDIENCE MONITORING SYSTEMS AND RELATED METHODS

CROSS REFERENCE TO RELATED APPLICATIONS

This application is a continuation of U.S. patent application Ser. No. 18/327,208, now U.S. Pat. No. 12,063,463, filed on Jun. 1, 2023, titled "Audience Monitoring Systems and Related Methods," which is a continuation of U.S. patent application Ser. No. 17/175,354, now U.S. Pat. No. 11,711,638, filed on Feb. 12, 2021, titled "Audience Monitoring Systems and Related Methods," which claims the benefit of U.S. Provisional Patent Application No. 63/045, 507, titled "Audience Monitoring Systems and Related Methods," filed Jun. 29, 2020, each of which is incorporated herein by this reference in its entirety.

FIELD OF THE DISCLOSURE

This disclosure relates generally to audience monitoring and, more particularly, to audience monitoring systems and related methods.

BACKGROUND

Media ranking and rating companies obtain audience data from households using portable and stationary metering devices in the household.

BRIEF DESCRIPTION OF THE DRAWINGS

FIG. 5 is a flowchart representative of example machine readable instructions that may be executed to implement an example data analyzer of the example collection facility of FIG. 3.

In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

There is a desire to identify proximity of people to media devices in a home to identify the audience, audience compliance, and/or illogical behavior for a wearable or portable audience measurement device. True audience measurement, compliance, and illogical behavior are qualifiers of data integrity and accuracy of audience measurement.

Example apparatus, systems, and methods disclosed herein use wearables, portables, and/or ping beacons to measure the audience. Information obtained by the devices can be analyzed and used to curtail over-representation due to misuse, intentional or unintentional, of audience measurement equipment. An example audience monitoring system disclosed herein includes one or more portable metering devices carried by persons in a household. The portable metering devices pick up audio signals to determine which types of media (e.g., movies, TV shows, advertisements, etc.) the associated person is engaged with and/or otherwise exposed to in the household. The system includes one or more ping beacons associated with various presentation devices (e.g., TVs, stereos, etc.) in the household. The portable metering devices can ping the beacons to determine the distances between the portable metering device and the surrounding presentation devices. This information can be used to determine which presentation device a person associated with a given portable metering device is likely engaged with and, thus, which presentation device is being detected by the portable metering device. To improve the identification, a measurement of the sound waves and identifiable codes from the presentation device(s) can further fine tune the determination of the proximity of the portable metering to the most likely presentation device the person is engaged with.

Figure 1:
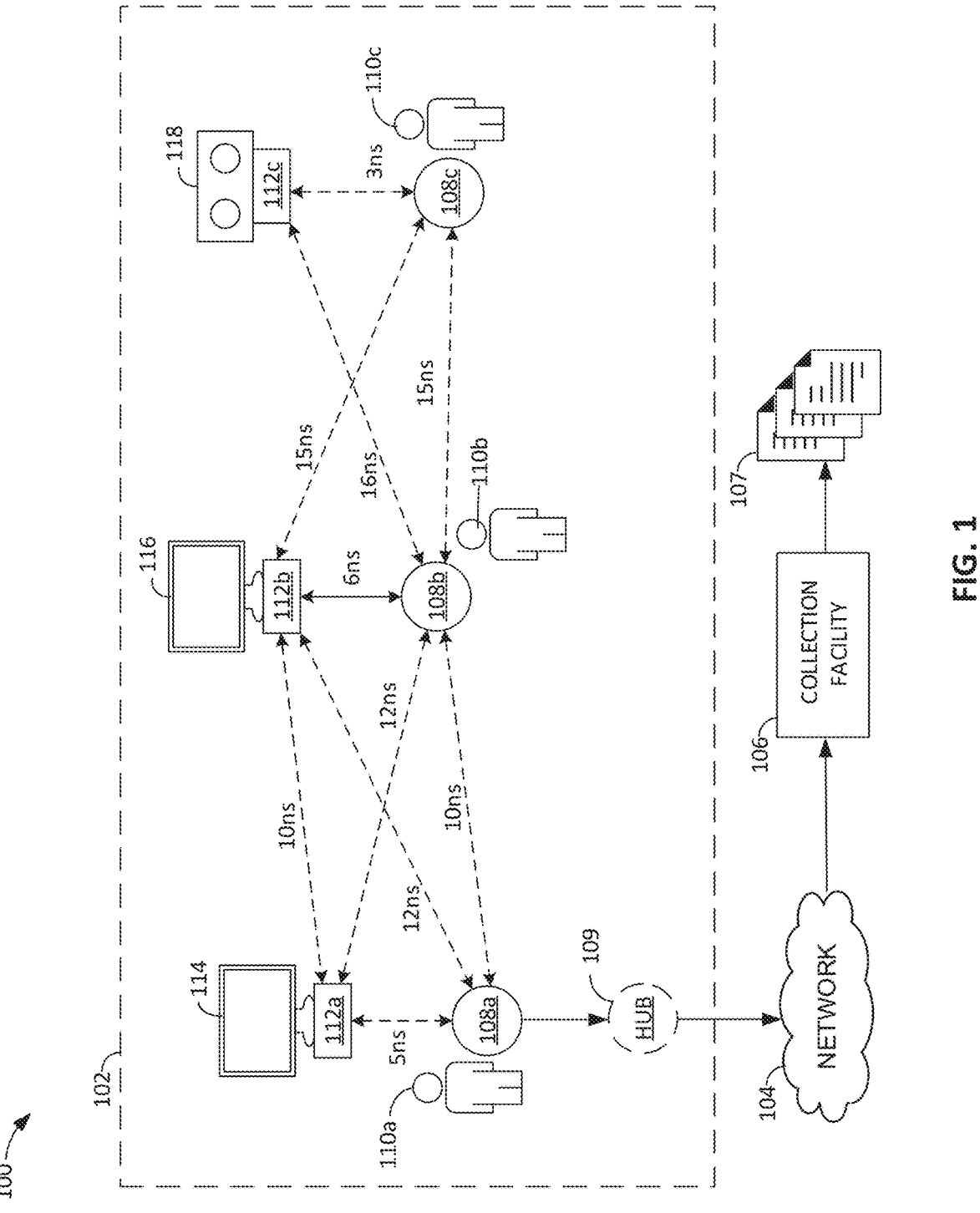
FIG. 1 is a block diagram of an example audience monitoring system including example portable metering devices and example ping beacons constructed in accordance with the teachings of this disclosure.

FIG. 1 is an example audience monitoring system 100 constructed in accordance with the teachings of this disclosure. In this example, the audience monitoring system 100 is implemented in connection with a building 102, such as a household (referred to herein as the household 102). The system 100 may include one or more metering devices, such as portable metering devices (sometimes referred to as wearables or portable people meters (PPMs)) and/or stationary metering devices, such as Global Television Audience Metering (GTAM) meters, A/P meters, Nano meters, etc. A portable metering device may be a wearable device that is worn (e.g., on a clothing item, on the wrist of the person, etc.) and/or otherwise carried by a person (sometimes referred to as a user or a panelist). A stationary metering device may be connected to and/or disposed adjacent a media presentation device (e.g., a TV, a stereo, a computer, etc.). Each metering device has a unique identifier (ID) for that meter and is associated with a household ID (also referred to as a folder ID for the household). Each metering device generates and collects signatures (sometimes referred to as fingerprints) from the audio sources and/or collects codes (sometimes referred to as watermarks) from audio sources. These signatures and/or codes are collected, logged by each meter, and sent (e.g., via a network 104, such as the Internet) to a collection facility 106 for processing. The collection facility 106 can determine, based on the collected signatures or codes, the specific media (e.g., a TV show, a movie, a commercial, etc.) the metering device was exposed to and, thus, the audience exposed to the media. The collection facility 106 can aggregate this information from many households to provide ratings and/or rankings reports 107 and/or other information to media and/or advertising providers. In some examples, the system 100 may include a central hub 109 that collects all of the data from the metering devices and then transmits the data to the collection facility 106. Some audience measurement meters require a panelist to interact with the system 100, which enables the collection facility 106 to determine who in the audience is exposed to the media.

In the illustrated example, the system 100 includes three example portable metering devices including a first example portable metering device 108a, a second example portable metering device 108b, and a third example portable metering device 108c. Each of the portable metering devices 108a-108c is registered to and associated with a particular person of the household 102. For example, the first portable metering device 108a is registered to a first user 110a (e.g., "Bill"), the second portable metering device 108b is registered to a second user 110b (e.g., "Wendy"), and the third portable metering device 108c is be registered to a third user 110c (e.g., "Ashley"). The portable metering devices 108a-108c are to be carried (e.g., worn on a wrist, clipped to a pant pocket, etc.) by the respective users 110a-110c while the users 110a-110c are at the household 102 and exposed to media from various sources (e.g., TVs, stereos, computers, tablets, etc.). In other examples, the system 100 may include more or fewer portable metering devices (e.g., one device, two devices, four devices, five devices, etc.) for more or fewer people of the household 102. The portable metering devices 108a-108c and the users 110a-110c are registered with a particular household ID with the collection facility 106.

The example system 100 also includes one or more ping beacons, referred to herein as beacons. The beacons can be used to determine proximity of the portable metering devices to the various media presentation devices of the household 102, as disclosed in further detail herein. In this example, the system 100 includes three example beacons, including a first example beacon 112a, a second example beacon 112b, and a third example beacon 112c. Each of the beacons 112a-112c is associated with a specific media presentation device of the household 102. For example, the first beacon 112a is associated with a first television (TV) 114 in a first room (e.g., a living room) of the household 102, the second beacon 112b is associated with a second TV 116 in a second room (e.g., a bedroom) of the household 102, and the third beacon 112c is associated with a radio 118 on a patio of the household 102. Each of the beacons 112a-112c is registered to its corresponding media presentation device. In other examples, the system 100 can include more or fewer media presentation devices and/or associated beacons.

The beacons 112a-112c are to be disposed proximate and/or coupled to their associated media presentation devices. In some examples, the beacons 112a-112c are standalone devices. For example, the first beacon 112a can be a standalone device disposed on a TV stand next to (e.g., within a few feet) of the first TV 114. In other examples, the first beacon 112a can be coupled to the first TV 114 (e.g., attached to a side or back of the first TV 114). In some examples, one or more of the beacons 112a-112c are powered via a power supply (e.g., a battery) and/or may be plugged into an outlet to receive power. In some examples, one or more of the beacons 112a-112c can be a device plugged into the associated media presentation device. For example, the first beacon 112a can be a Universal Serial Bus (USB) device plugged into a USB port on the first TV 114. In such an example, the USB port may power the first beacon 112a. In other examples, one or more of the beacons 112a-112c can be integrated into the associated media presentation device. For example, the first beacon 112a can be integrated into the first TV 114.

Table 1 below summarizes an example device configuration of the system 100.

TABLE 1

| Folder ID | Meter ID | Type | Belongs to |
|---|---|---|---|
| 12345-6 | 108a | Wearable with Beacon | Bill—110a |
| 12345-6 | 108b | Wearable with Beacon | Wendy—110b |
| 12345-6 | 108c | Wearable with Beacon | Ashley—110c |
| 12345-6 | 112a | Site Beacon A | Living Room TV |
| 12345-6 | 112b | Site Beacon B | Bedroom TV |
| 12345-6 | 112c | Site Beacon C | Patio Radio |

The above table and/or data from the table can be stored in the collection facility 106 under a corresponding folder number or profile associated with the household 102. The profile can be updated as new users, portable metering devices, beacons, and/or media presentation devices are added or removed.

Assume, for example, the first user 110a is watching the first TV 114 in the living room, the second user 110b is watching the second TV 116 in the bedroom, and the third user 110c is listening to the radio 118 on the patio. The metering devices 108a-108c may pick up or detect audio signals from multiple presentation devices. For example, the first portable metering device 108a on the first user 110a may be picking up audio signals from the first TV 114 in the living room and the second TV 116 in the bedroom. The first portable metering device 108a can generate and/or detect the audio signatures or codes in the audio signals. The first portable metering device 108a transmits the audio signals and/or signatures/codes (e.g., via the network 104) to the collection facility 106. This data can be used to determine which media is presented in the household 102, which media the first user 110a is exposed to, how much media the first user 110a is exposed to, etc. Similarly, the second and third portable metering devices 108b, 108c pick up audio signals from the media presentation devices in the household 102 and report the information to the collection facility 106.

It may be desirable to know which media each user is actually exposed to (e.g., watching and/or listening to) and/or which presentation device each user is actually engaged with. For example, even though the first user 110a is in the living room with the first TV 114, the first user 110a may be able to hear sounds from the second TV 11b and/or the radio 112c. Therefore, because of possible bleed over from other presentation devices, a portable metering device may pick up multiple audio signals. As such, with known systems, it is difficult to ascertain which media the user is actually exposed to and/or engaged.

Therefore, the system 100 includes the example beacons 112a-112c. Each of the portable metering devices 108a-108c and the beacons 112a-112c can broadcast (e.g., transmit) a request ping signal that is received by the surrounding devices. When a request ping signal is received by a metering device or a beacon, the receiving metering device or beacon transmits a return ping signal (along with identifying information (e.g., a media access control (MAC) address)) that is received by the requesting metering device or beacon. The request and return ping signals can be any type of signal, such as radio frequency (RF) signals, infrared (IR) signals, audio signals, electronic signals, etc. For example, as shown in FIG. 1, the first portable metering device 108*a* associated with the first user 110*a* can transmit (e.g., broadcast) a request ping signal. The request ping signal is received by the first beacon 112*a*. In response to the request ping signal, the first beacon 112*a* transmits a return ping signal, which is received by the first portable metering device 108. In addition, the first portable metering device 108*a* receives responses from the second portable metering device 108*b* associated with the second user 110*b* and the second beacon 112*b* associated with the second TV 116. Therefore, the first portable metering device 108*a* receives responses from any of the devices or beacons within range of the first portable metering device 108*a* (e.g., depending on the strength of the transmitted signals, which may be configurable, pre-determined, etc.). Similarly, the second portable metering device 108*b* is able to ping the second beacon 112*b*, but also receives responses from the first portable metering device 108*a*, the first beacon 112*a* associated with the first TV 114, the third portable metering device 112*c*, and the third beacon 112*c* associated with the radio 118. Similarly, the third portable metering device 108*c* receives a ping from the third beacon 112*c* associated with the radio 118, but also receives responses from the second portable metering device 108*b* and the second beacon 112*b* associated with the second TV 116. Each beacon is also able to communicate to other wearable beacons within a pinging distance (e.g., depending on the strength of the ping signals, which may be configurable, pre-determined, etc.).

Return ping signals have a delta time value relative to a time of the sent request ping signal. The closer the delta time is to zero, the closer the device is to the beacon or the portable metering device. This allows a portable wearable device to identify which device being measured is closest and most likely the source and if there are any other portable metering devices in close proximity. As an example, the lines in FIG. 1 show which beacons and/or metering devices can communicate with other beacons and/or metering devices and a ping time for each. The ping times represent the time between the time a request ping signal was sent from a portable metering device or beacon and the time a return ping signal was received at the portable metering device. In the illustrated example, the ping time between the first portable metering device 108*a* and the first beacon 112*a* associated with the first TV 114 is 5 nanoseconds (ns), the ping time between the first portable metering device 108*a* and the second beacon 112*b* associated with the second TV 116 is 12 ns, the ping time between the first portable metering device 108*a* and the second portable metering device 108*b* is 10 ns, and so forth. These ping times are indicative of the distances between two of the devices. For example, the ping time of 5 ns between the first portable metering device 108*a* and the first beacon 112*a* is indicative of the distance between the first portable metering device 108*a* and the first beacon 112*a*. In some examples, the portable metering devices 108*a*-108*c* store these ping times. In some examples, the portable metering devices 108*a*-108*c* calculate the distances (e.g., in feet, in meters, etc.) based on the ping times. The ping times and/or distances are considered distance values. A distance value (e.g., a ping time, a distance, etc.) is indicative of the distance between two devices. Therefore, the portable metering devices determine these distance values based on ping signals from the various devices. These distance values can be compared to determine the proximity or location of a portable metering device relative to other devices. Moreover, the distance values can be used to determine which media the respective user is exposed to and/or engaged with, as disclosed in further detail herein. Additionally or alternatively, this distance information can be sent back to the collection facility 106 and used to determine which presentation device each of the people are engaged with and improve compliance and accuracy of the information.

In some examples, the portable metering devices 108*a*-108*c* and/or the beacons 112*a*-112*c* can be configured to transmit request ping signals at a set frequency, such as every 10 seconds, every minute, every 5 minutes, etc. Additionally or alternatively the portable meter metering devices 108*a*-108*c* can be configured to transmit request ping signals in response to a recent movement. For example, the first portable metering device 108*a* can include a motion sensor (e.g., an accelerometer). After resting for a while (e.g., corresponding to a threshold duration of time, which may be configurable), if the first portable metering device 108*a* detects motion (e.g., because first user 110*a* leaves the room to go to the kitchen), the first portable metering device 108*a* transmits a ping request signal, which enables the first portable metering device 108*a* to update the distance information.

In some examples, some or all of the devices of the system 100 are clock synchronized. In some examples, some or all of the devices of the system 100 are configured to automatically transmit a ping signal at a set interval (e.g., every minute). The surrounding devices within range receive the pings. Those devices can use the ping information (e.g., the time stamp of the ping and the device ID) to determine the distances between the devices. For example, the first beacon 112*a*, the second beacon 112*b*, and the second portable metering device 108*b* may automatically transmit a ping signal at a set frequency. The ping signals are received by the first portable metering device 108*a*. Each ping signal includes a time stamp and a device ID. For example, the second beacon 112*b* may transmit a ping signal that includes a time stamp (e.g., 1:14:07 pm) and an ID (e.g., a MAC address of the second beacon 112*b*). The first portable metering device 108*a* receives the ping signals and determines the distance values (e.g., ping times and/or distances) between the first portable meter device 108*a* and the other devices and/or beacons.

In some examples, the power or strength of the audio signals can be used to help determine which presentation device the person is exposed to and/or engaged. For example, the first portable metering device 108*a* can determine the power levels of the received audio signals. For example, assume the first portable metering device 108*a* receives a first audio signal (e.g., which may be from the first TV 114 but unknown to the first portable metering device 108*a*) and a second audio signal (e.g., which may be from the second TV 116 but unknown to the first portable metering device 108). Assume that the first portable metering device 108*a* determines the first audio signal has a first power level and the second audio signal has a second power level that is less than the first power level. Because the first user 110*a* is closest to the first beacon 112*a* at the first TV 114, and the first audio signal is the most powerful (e.g., loudest), it can be assumed that the first audio signal is from the first TV 114. Therefore, the first user 110*a* is engaged with the media from the first TV 114, and not the media associated with the second audio signal from the second TV 116 or the media presented on the radio 118. The second and third portable metering devices 108*b*, 108*c* similarly determine which media presentation device the associated user is likely engaged with. Therefore, in some examples, the system 100 eliminates the need for stationary metering devices to determine what the presentation devices are outputting, because the portable metering devices can determine what the presentation devices are outputting and which device the person is closest to. This also eliminates the need for people to interact with the metering devices. The portable meter devices 112a-112c transmit the correlation information to the collection facility 106. The collection facility 106 can use this information to generate the reports 107.

In some examples, one or more stationary metering devices can be associated with the media presentation devices. For example, a stationary metering device can be associated with (e.g., connected to, disposed adjacent) the first TV 114. The stationary metering device determines the media presented on the first TV 114. In such an example, based on the first user's proximity to the first beacon 112a at the first TV 114, the system 100 can determine Bill is exposed to and engaged with the media at the first TV 114.

These examples can also help curb illogical behavior, such as if one person is wearing all three of the portable metering devices 108a-108c, which may manipulate the media rating or rankings. For example, the collection facility 106 may monitor the distance values of the portable metering devices 108a-08c to determine if all of the metering devices are moving together and in the same location relative to the other devices. If the collection facility 106 determines the portable metering devices 108a-108c are moving together too closely, the collection facility 106 may flag the data and consider it corrupted.

While the example system 100 is described in connection with the household 102, it is understood the system 100 could be used in other locations where multiple presentation devices (e.g., TVs) and audience measurement is desired. For example, the example system 100 could be used in an airport, at a mall, at a school, etc.

Figure 2:
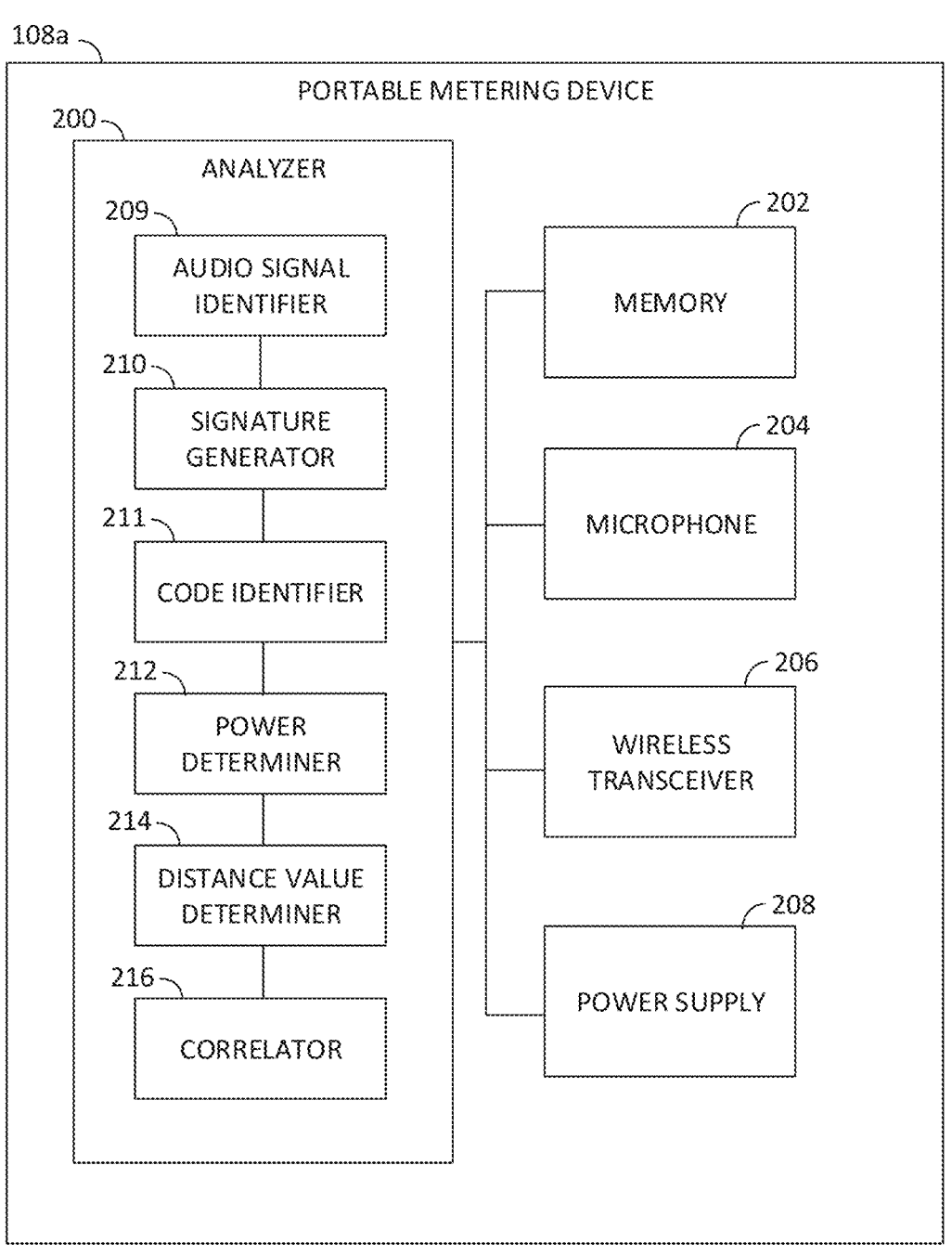
FIG. 2 is a block diagram of an example portable metering device of the example audience monitor system of FIG. 1.

FIG. 2 is a block diagram of the first portable metering device 108a. The second and third portable metering devices 108b, 108c may be the same as the first portable metering device 108a. Therefore, any of the example structures or functions disclosed in connection with the first portable meter device 108a can likewise apply to the second and third portable metering devices 108b, 108c. In the illustrated example, the first portable metering device 108a includes an example analyzer 200 (which may also be referred to as an audio signal analyzer), example memory 202, an example microphone 204, an example wireless transceiver 206, and an example power supply 208. The analyzer 200 may be implemented by a processor or logic circuit of the portable metering device 1A. The power supply 208 may be, for example, one or more batteries (e.g., rechargeable battery(ies)).

In some examples, identifying information of the portable metering device 108a and/or or the other devices of the system 100 is stored in the memory 202. For example, Table 1 can be stored in the memory 202. The microphone 204 monitors for and receives audio signals form the surrounding environment.

The analyzer 200 includes an audio signal identifier 209 that isolates or separates out multiple audio signals from the received/sensed audio signal at the microphone 204. In particular, the microphone 204 may sense or detect an audio signal that includes multiple audio signals from the two or more presentation devices. For example, if two presentation devices are producing audio, the microphone 204 senses a combination of the audio signals from the two presentation devices. The audio signal identifier 209 analyzes the received/sensed audio signal to determine if the received/sensed audio signal is a combination of two or more individual audio signals. If the audio signal identifier 209 identifies there are two or more audio signals in the received/sense audio signal, the audio signal identifier 209 separates the audio signals into individual audio signals (e.g., a first audio signal (which may be from a first presentation device), a second audio signal (which may be from a second presentation device), etc.).

In the illustrated example, the analyzer 200 includes a signature generator 210 that can generate a signature for an audio signal identified by the audio signal identifier 209 (or generate multiple signatures for multiple audio signals from the audio signal identifier 209). In the illustrated example, the analyzer 200 also includes a code identifier 211 that can identify a code in an audio signal identified by the audio signal identifier 209 (or multiple codes in multiple audio signals from the audio signal identifier 209). In other examples, only one of the signature generator 210 or the code identifier 211 may be implemented. The signatures and/or codes can be used to identify the media associated with the audio signals, as disclosed in further detail herein. The signature generator 210 can time stamp and store the audio signals and/or the associated signature(s) in the memory 202. Similarly, the code identifier 211 can time stamp and store the audio signals and/or the associated code(s) in the memory 202. In some examples, the signature generator 210 and/or the code identifier 211 constantly receive audio signals from the audio signal identifier 209 (and/or directly from the microphone 204) and sample the audio signals at a certain interval or frequency, such as 8,000 samples/second. In other examples, the signature generator 210 and/or the code identifier 211 can sample the audio signals at higher or lower frequency.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

The analyzer 200 includes an example power determiner 212 that determines the power level or strength in each of the received audio signals. In some examples, the power determiner 212 determines the power level based on measurements from a power sensor electrically coupled to the microphone 204. The power level of an audio signal is indicative of the loudness or sound level of the audio signal. The power determiner 212 can store the power levels of the associated audio signals in the memory 202.

The analyzer 200 includes an example distance value determiner 214. The distance value determiner 214 instructs the wireless transceiver 206 to transmit a request ping signal. The wireless transceiver 206 may be, for example, a low frequency RF transceiver or a Bluetooth® transceiver. The wireless receiver 206 listens for and receives return ping signals from surrounding devices, such as the beacons and/or other portable metering devices. The distance determiner 214 determines the distance values (e.g., ping times or distances) indicative of the distances between the first portable metering device 108a and the surrounding devices based on the time between the initial ping request and the time the return ping signals are received. For example, the distance determiner 214 can determine a distance value (e.g., a ping time) indicative of a distance between the first portable metering device 108a and the first beacon 112a based on the return ping signal from the first beacon 112a. The distance value determiner 214 can store the distance values of the associated devices in the memory 202. In some examples, the distance value determiner 214 instructs the wireless transceiver 206 to ping the other devices at a set interval or frequency, such as every 5 minutes. In other examples, the distance value determiner 214 can instruct the wireless transceiver 206 to ping the other device at a higher or lower frequency. In some examples, the distance value determiner 214 can change the frequency using the Bluetooth Interval parameter, sometimes referred to as the BINT parameter. In some examples, the portable metering device 108a receives instructions from the hub 109 (FIG. 9)

to change the frequency and/or other parameters using Network Interval parameters. For example, the collection facility 106 can instruct the devices (via communication through the hub 109) to transmit ping signals at a particular frequency (e.g., every second, 5 seconds, 10 seconds, one minute, 5 minutes, etc.).

The analyzer 200 includes an example correlator 216 that correlates the audio signals with the surrounding devices (and/or the associated media presentation devices). In some examples, the correlator 216 correlates the audio signal with the highest power level to the closest beacon, the audio signal with the next highest power level to the next closest beacon, and so forth, to identify which audio signal corresponds to which presentation device. Therefore, the correlation is based at least in part on the power levels and at least in part on the distance values. For example, if power determiner 212 determines the first audio signal has the highest power level, and the distance value determiner 214 determines the first beacon 112a (associated with the first TV 114) is the closest device, the corrector 216 can correlate the first audio signal (and/or signature/code) with the first beacon 112a and/or the first TV 114. The correlator 216 stores this information in the memory 202. All of the information can also be transmitted (e.g., via the wireless transceiver 206) to the collection facility 106 for further analysis and/or reporting. In some examples, the first portable metering device 108a transmits the information at a set interval or frequency, such as every 5 minutes when a correlation is determined. In other examples, the first portable metering device 108a can transmit the information at a higher or lower frequency. This information could be used to track the location of a person throughout the household 102 and how the person is exposed to different media while moving throughout the household 102.

In some examples, one or more blocks of the analyzer 200 can be implemented in a beacon (e.g., the first beacon 112a), in the hub 109, and/or at the collection facility 106. For example, in some examples, the first portable metering device 108a can collect the audio signals and ping signals and send the information to the collection facility 106. The collection can then isolate the audio signals, generate signatures and/or detect codes in the audio signals, determine the power levels, determine the distance values, and perform the correlations, as disclosed in connection with the analyzer 200.

Figure 3:
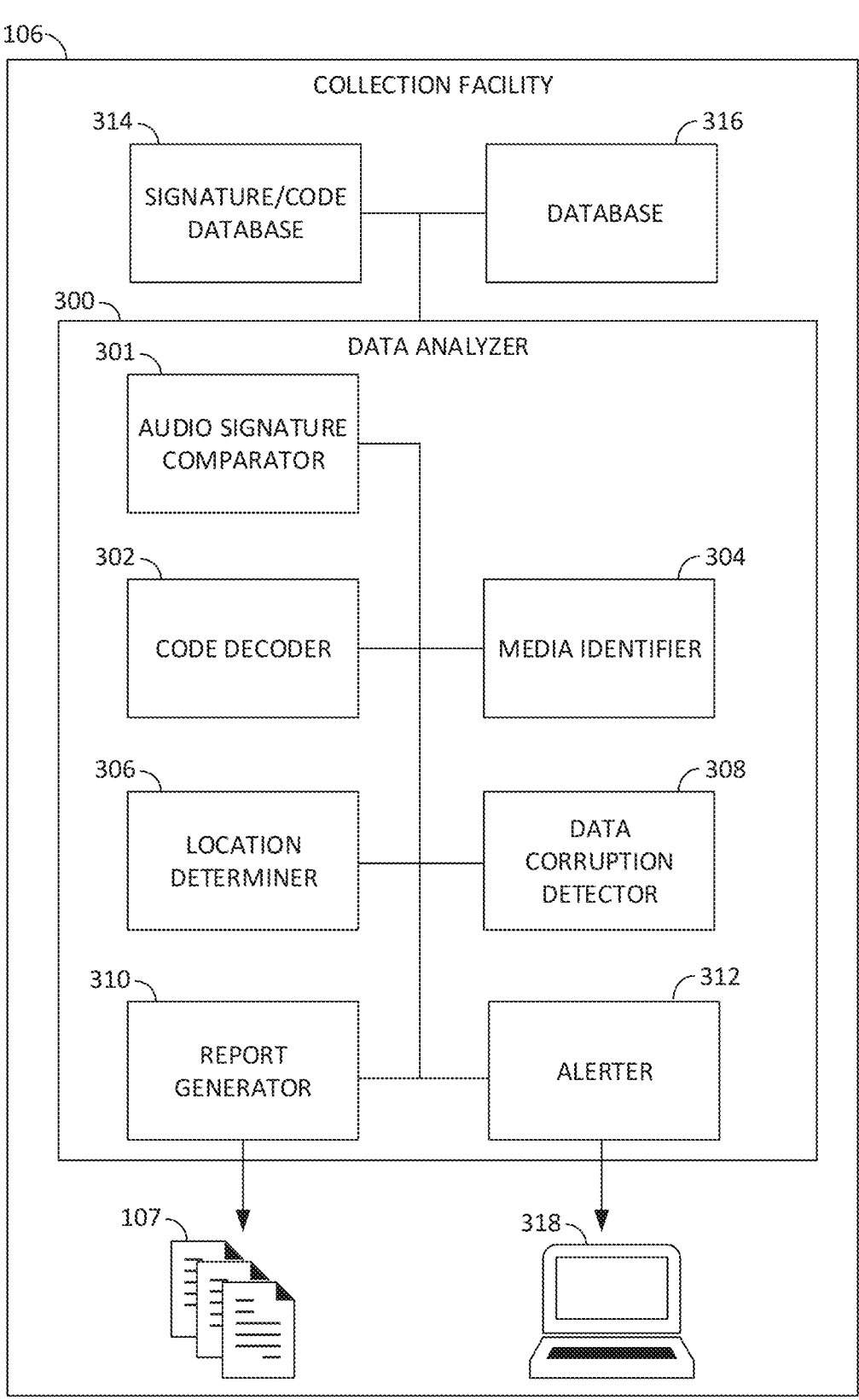
FIG. 3 is a block diagram of an example collection facility that may receive and analyze data from the example audience monitoring system of FIG. 1.

FIG. 3 is a block diagram of the example collection facility 106. In the illustrated example, the collection facility 106 includes a data analyzer 300 including an audio signature comparator 301, a code decoder 302, a media identifier 304, a location determiner 306, a data corruption detector 308, a report generator 310, and an alerter 312, a signature/code database 314, and a database 316.

The collection facility 106 receives the sampled audio signals and/or signatures/codes from the household 102 (e.g., via the network 104). The audio signature comparator 301 compares the signatures to reference signatures from known media stored in the signature/code database 314. The code decoder 302 decodes the codes and/or compares the codes to known codes associated with the known media stored in the signature/code database 314. The media identifier 304 determines if there is a match and, if so, identifies the media (e.g., movie, TV show, commercial, etc.) associated with the media signature or code. The media identifier 304 stores these identifications in the database 316. The report generator 310 can generate one or more reports 107 (e.g., electronic reports, physical paper reports, etc.) using these identifications from household data or data aggregated from multiple households. The reports 107 can include which media is being consumed, how long the media is being consumed, demographics of persons consuming which media, etc. In some examples, the reports 107 include media rankings. The collection facility 106 can offer these reports to media and/or advertising producers.

In some examples, the location determiner 306 analyzes the distance values from one or more of the portable metering devices and/or beacons to determine a person's location and/or movements throughout a household. For example, the location determiner 308 can use triangulation calculations based on distance values from three or more of the portable metering devices 108a-108c and/or the beacons 112a-112c to determine the location of the first user 110a and/or track the movement of the first user 110a in the household 102 during a certain time frame (e.g., the first user 110a was in the kitchen, and then in the living room, etc.). This location and/or tracking information can be stored in the database 316 and used in the reports 107.

In some examples, the collection facility 106 may analyze the distance values (and/or other data) from the portable metering devices 108a-108c and/or the beacons 112a-112c to detect illogical behavior. For example, one person may intentionally or unintentionally carry multiple portable metering devices that are supposed to be carried by other people. This activity can corrupt the metrics and rankings to be determined by the collection facility 106. The data corruption detector 308 can compare the location and/or tracking information (and/or signatures/codes) associated with multiple portable metering devices of with the household 102. If the information associated with two or more of the portable metering devices is the same (or within a small tolerance) over a period of time, the alerter 312 may flag the data in the database 316 as possibly inaccurate. Additionally or alternatively, if the distance values between two of the portable metering devices is the same (or within a small tolerance) for a period of time, the alerter 312 may flag the data in the database 316. In such instances, the data may not be used in the reports 107. Additionally or alternatively, the alerter 312 can generate an alert (e.g., a prompt) on an output device 318, such as a computer, to inform a user at the collection facility 106 that the data may be corrupted. The user can then manually review the data to confirm whether suspicious activity occurred.

While an example manner of implementing the analyzer 200 is illustrated in FIG. 2, one or more of the elements, processes and/or devices illustrated in FIG. 2 may be combined, divided, re-arranged, omitted, eliminated and/or implemented in any other way. Further, the example audio signal identifier 209, the example signature generator 210, the example code identifier 211, the example power determiner 212, the example distance determiner 214, the example correlator 216, and/or, more generally, the example analyzer 200 of FIG. 1 may be implemented by hardware, software, firmware and/or any combination of hardware, software and/or firmware. Thus, for example, any of the example the example audio signal identifier 209, the example signature generator 210, the example code identifier 211, the example power determiner 212, the example distance determiner 214, the example correlator 216, and/or, more generally, the example analyzer 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio signal identifier 209, the example signature generator 210, the example code identifier 211, the example power determiner 212, the example distance determiner 214, and/or the example correlator 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example analyzer 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
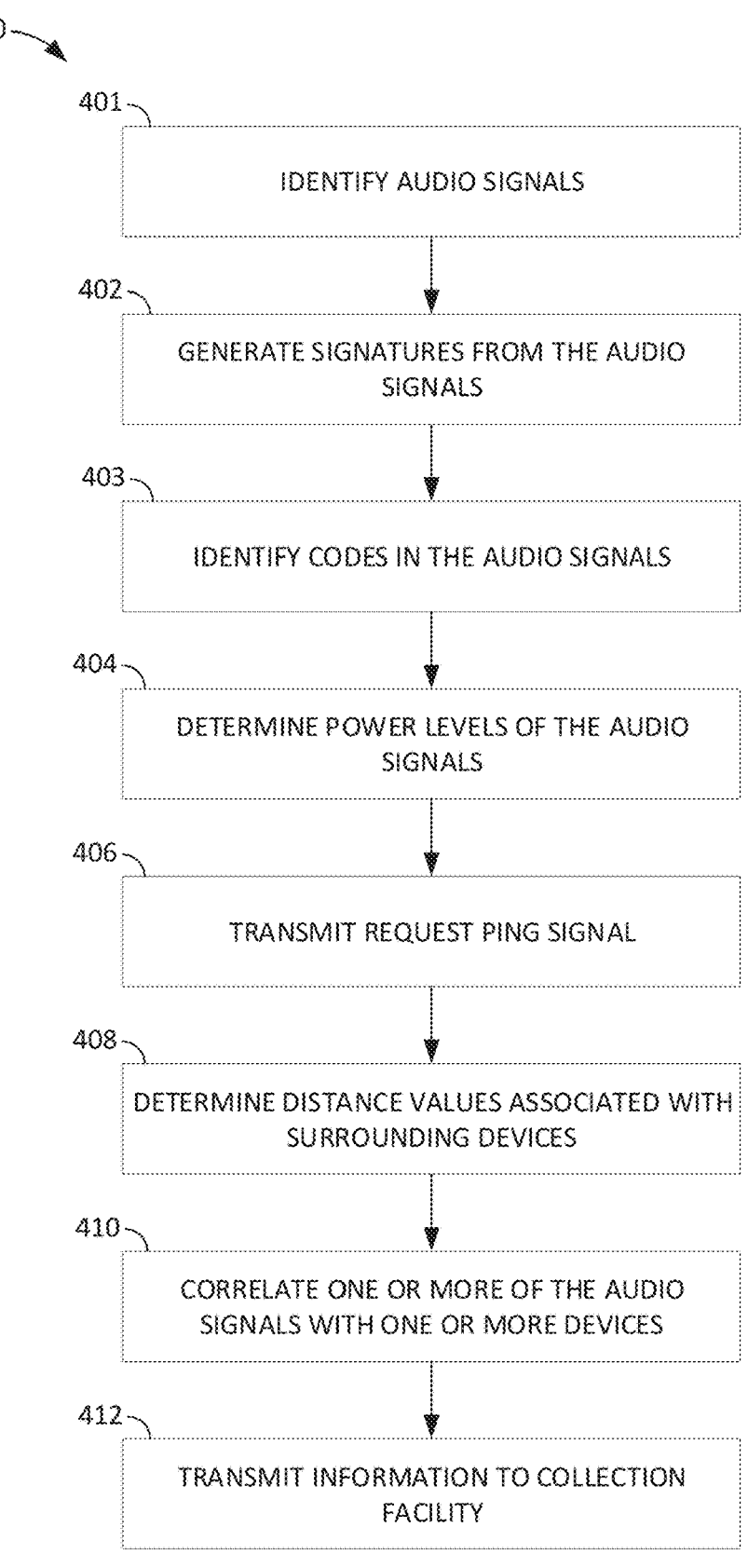
FIG. 4 is a flowchart representative of example machine readable instructions that may be executed to implement an example audio signal analyzer of the example portable metering device of FIG. 2.

A flowchart representative of example hardware logic, machine readable instructions, hardware implemented state machines, and/or any combination thereof for implementing the analyzer 200 of FIG. 2 is shown in FIG. 4. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example analyzer 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

While an example manner of implementing the data analyzer 300 is illustrated in FIG. 3, one or more of the elements, processes and/or devices illustrated in FIG. 3 may be combined, divided, re-arranged, omitted, eliminated and/or implemented in any other way. Further, the example audio signature comparator 301, the example code decoder 302, the example media identifier 304, the example location determiner 306, the example data corruption detector 308, the example report generator 310, the example alerter 312, and/or, more generally, the example data analyzer 300 of FIG. 3 may be implemented by hardware, software, firmware and/or any combination of hardware, software and/or firmware. Thus, for example, any of the example audio signature comparator 301, the example code decoder 302, the example media identifier 304, the example location determiner 306, the example data corruption detector 308, the example report generator 310, the example alerter 312, and/or, more generally, the example data analyzer 300 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio signature comparator 301, the example code decoder 302, the example media identifier 304, the example location determiner 306, the example data corruption detector 308, the example report generator 310, and/or the example alerter 312 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data analyzer 300 of FIG. 3 may include one or more elements, processes and/or devices in addition to, or instead of, those illustrated in FIG. 3, and/or may include more than one of any or all of the illustrated elements, processes and devices.

A flowchart representative of example hardware logic, machine readable instructions, hardware implemented state machines, and/or any combination thereof for implementing the data analyzer 300 of FIG. 3 is shown in FIG. 5. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example data analyzer 300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4 and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart of an example process 400, representative of machine readable instructions, that can be executed to implement the example analyzer 200 of a portable metering device, such as the first portable metering device 108a. The instructions can be executed by one or more processors of the first portable meter device 108, for example. The example process 400 is described in connection with the first portable metering device 108a. However, it is understood that the example process 400 can be similarly implemented by the other portable metering devices 108b, 108c.

As disclosed above, the first portable metering device 108a includes the microphone 204. The microphone 204 receives or otherwise listens for one or more audio signals from the surrounding environment, such as audio signals from the first TV 114, the second TV 116, and/or any other media presentation device (e.g., a TV, a computer, a smart phone, a smart watch, a radio, etc.), that might be within listening range of the first user 110a. At block 401, the audio signal identifier 209 identifies (e.g., isolates or separates outs) one or more audio signals from the sensed audio signal at the microphone 204. For example, if a first audio signal and a second audio signal are received by the microphone 204, the audio signal identifier 209 isolates/separates and identifies the first and second audio signals. At block 402, the signature generator 210 generates signatures for the audio signals identified by the audio signal identifier 209.

Additionally or alternatively, at block 403, the code identifier 211 identifies codes in the audio signals identified by the audio signal identifier 209.

At block 404, the power determiner 212 determines the power levels of the audio signals. For example, the audio signal identifier 209 might identify the microphone 204 picked up a first audio signal from a first media presentation device and a second audio signal from a second media presentation device. The power determiner 212 may determine the first audio signal has a first power level and the second audio level has a second power level that is less than the first power level. This is indicative that the first audio signal is louder than the second audio signal at the location of the first user 110a and the first portable metering device 108a.

At block 406, the distance determiner 214 causes the wireless transceiver 206 to transmit (broadcast) a request ping signal. Any of the surrounding devices (e.g., beacons, other portable metering devices, etc.) of the system 100 that receive the request ping signal then transmit a return ping signal. The return ping signals are received by the wireless transceiver 206 of the first portable metering device 108a. The return ping signals include the identification of the associated devices.

At block 408, the distance determiner 314 determines distance values representative of the distances between the portable metering device 1A and other devices which transmitted a return ping signal, such as the beacons and/or the other portable metering devices. The distance values may be represented in time values (e.g., ping times) or distances (e.g., in meters, in feet, etc.). For example, the distance determiner 314 may determine a first distance value that is indicative of a first distance between the first portable metering device 108a and the first beacon 112a based on the time between the time the request ping signal was transmitted from the first portable metering device 108a and the time a first return ping signal from the first beacon 112a was received at the first portable metering device 108. Similarly, the distance determiner 314 may determine a second distance value indicative of a distance between the first portable metering device 108a and the second beacon 112b based on the time between the time the request ping signal was transmitted from the first portable metering device 108a and the time a second return ping signal from the second beacon 112b was received at the first portable metering device 108, and so forth.

In other examples, one or more of the devices of the system 100 (e.g., beacons, metering devices, etc.) may automatically transmit ping signals at certain times without receiving a request ping signal. For example, the first beacon 112a can be configured to transmit pings signals at a certain frequency, such as every minute or every 5 minutes. The ping signals include the beacon ID and a time stamp. The wireless transceiver 206 of the first portable metering device 108a receives the ping signals and the distance determiner determines the distance between first portable metering device 108a and the first beacon 112a based on the ping signal.

At block 410, the correlator 216 correlates one or more of the audio signals (and/or the extracted audio signatures/codes) with one or more of the presentation devices. In some examples, this correlation is based on the determined power levels (block 404) of the audio signals and the determined distance values (block 408). For example, assume the power determiner 212 determines a first audio signal received by the microphone 204 has a first power level and a second audio signal received by the microphone 204 has a second power level, wherein the first power level is greater than the second power level. Also, assume the distance determiner 214 determines a first distance value indicative of a first distance between the first portable metering device 108a and the first beacon 112a (associated with the first TV 114) based on a first ping signal from the first beacon 112, and the distance determiner 214 determines a second distance value indicative of a second distance between the first portable metering device 108a and the second beacon 112b (associated with the second TV 116) based on a second ping signal from the second beacon 112b, where the first distance is less than the second distance. The correlator 216 determines the first audio signal is from the first TV 114 based on the first power level, the second power level, the first distance value, and the second distance value. The correlator 216 correlates the first audio signal (and/or the audio signature) with the first TV 114 based on the first distance value being less than the second distance value and the first power level being greater than the second power level.

In some examples, at block 412, the wireless transceiver 206 transmits this information, such as the correlation, to the collection facility 106 (e.g. via the hub 107 and/or the network 104). The correlation can include the identity of the first portable metering device 108a, the audio signal (and/or audio signature, the audio code, etc.), a time stamp, and the corresponding media presentation device. Additionally or alternatively, the wireless transceiver 206 can transmit other information to the collection facility 106 such as the other received audio signals, the signatures, the codes, the time stamps, and/or the distance values, etc.

The example process 400 of FIG. 4 can be repeated by the first portable metering device 108a at a particular frequency, such as every minute, every five minutes, etc. Therefore, the system 100 is continuously monitoring the audience.

FIG. 5 is a flowchart of an example process 500, representative of machine readable instructions, that can be executed to implement the example data analyzer 300 of the collection facility 106. The instructions can be executed by one or more processors of the collection facility 106, for example. The process 500 is described in connection with information received from the first portable metering device 108a. However, it is understood that the process 500 can be similarly performed in connection with information received from the other portable metering devices 108b, 108c.

The collection facility 106 receives information from the first portable metering device 108a, such as samples of the audio signals, audio signatures/codes from the audio signals, time stamps, distance values and associated device information, etc. The collection facility 106 stores the information in the database 316. At block 502, the audio signature comparator 301 compares each audio signature to reference audio signatures of known media stored in the signature/code database 314. Additionally or alternatively, at block 503, the code decoder 302 decodes each audio code and/or compares the audio code to reference audio codes of known media stored in the signature/code database 314. At block 504, the media identifier 304 identifiers a match between an audio signature/code and a reference audio signature/code and stores the match in the database 316.

At block 506, the location determiner 306 determines the location of the first portable metering device 108a (and, thus, the first user 110a) during a time period using distance values associated with one or more surrounding devices, such as the first beacon 112a, the second beacon 112b, the second portable metering device 108b, etc. The location determiner 506 similarly determines the location of the other portable metering devices 108b, 108c during the same time period using distance values obtained by the devices.

At block 508, the data corruption detector 308 determines if the data is corrupted based on the determined locations. For example, the data corruption detector 308 may compare the locations of the first and second portable metering devices 108a, 108b during the time period (determined at block 506). If the locations are the same or substantially the same (e.g., within a tolerance), the first and second portable metering device 108a, 108b are likely being carried by the same user and, thus, the data is corrupted. In such an instance, at block 508, the alerter 312 flags the data and generate an alert on the output device 318, such that a user of the collection facility 106 can review the data. Additionally, in such an example, the data may not be used when generating the ratings or rankings reports.

If the data corruption detector 308 determines the location of the first portable metering device 108a is not the same or substantially the same as another portable metering device, then, at block 512, the report generator 310 can use the data from the first portable metering device 108a to generate the reports 107. The example process 500 can repeated each time new data is received.

Figure 6:
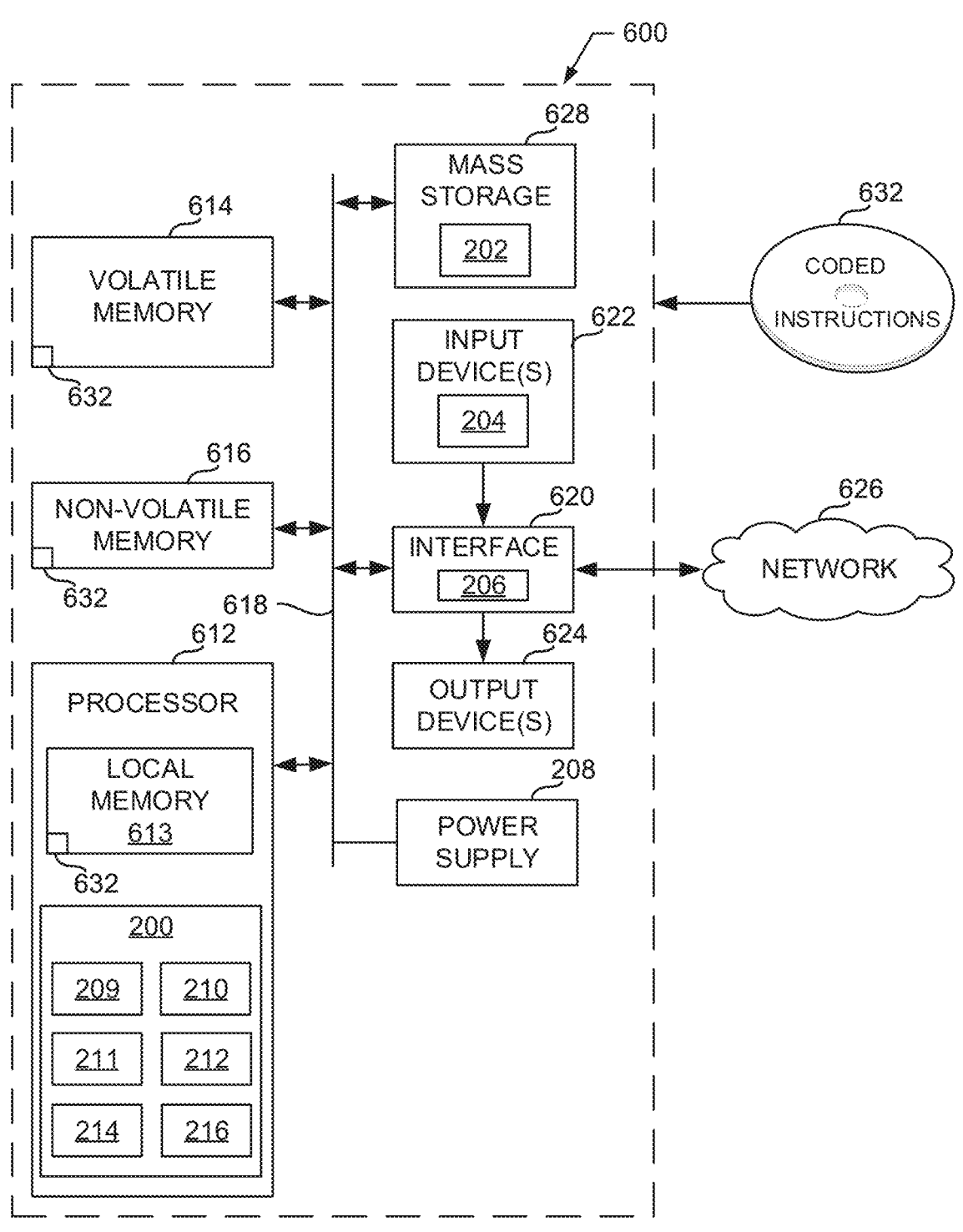
FIG. 6 is a block diagram of an example processing platform structured to execute the instructions of FIG. 4 to implement the example audio signal analyzer of FIG. 2.

FIG. 6 is a block diagram of an example processor platform 600 structured to execute the instructions of FIG. 4 to implement a portable metering device including the analyzer 200 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example audio signal identifier 209, the example signature generator 210, the example code identifier 211, the example power determiner 212, the example distance determiner 214, and the example the correlator 216 and/or, more generally, the analyzer 200.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user and/or a device to enter data and/or commands into the processor 612. The input device(s) 622 can include the microphone 204. Additionally or alternatively, the input device(s) 622 can be implemented by, for example, an audio sensor, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. In some examples, the mass storage 628 includes the memory 202.

The machine executable instructions 632 of FIG. 4 may be stored in the mass storage device 628, in the volatile memory 614, in the non-volatile memory 616, and/or on a removable non-transitory computer readable storage medium such as a CD or DVD.

Figure 7:
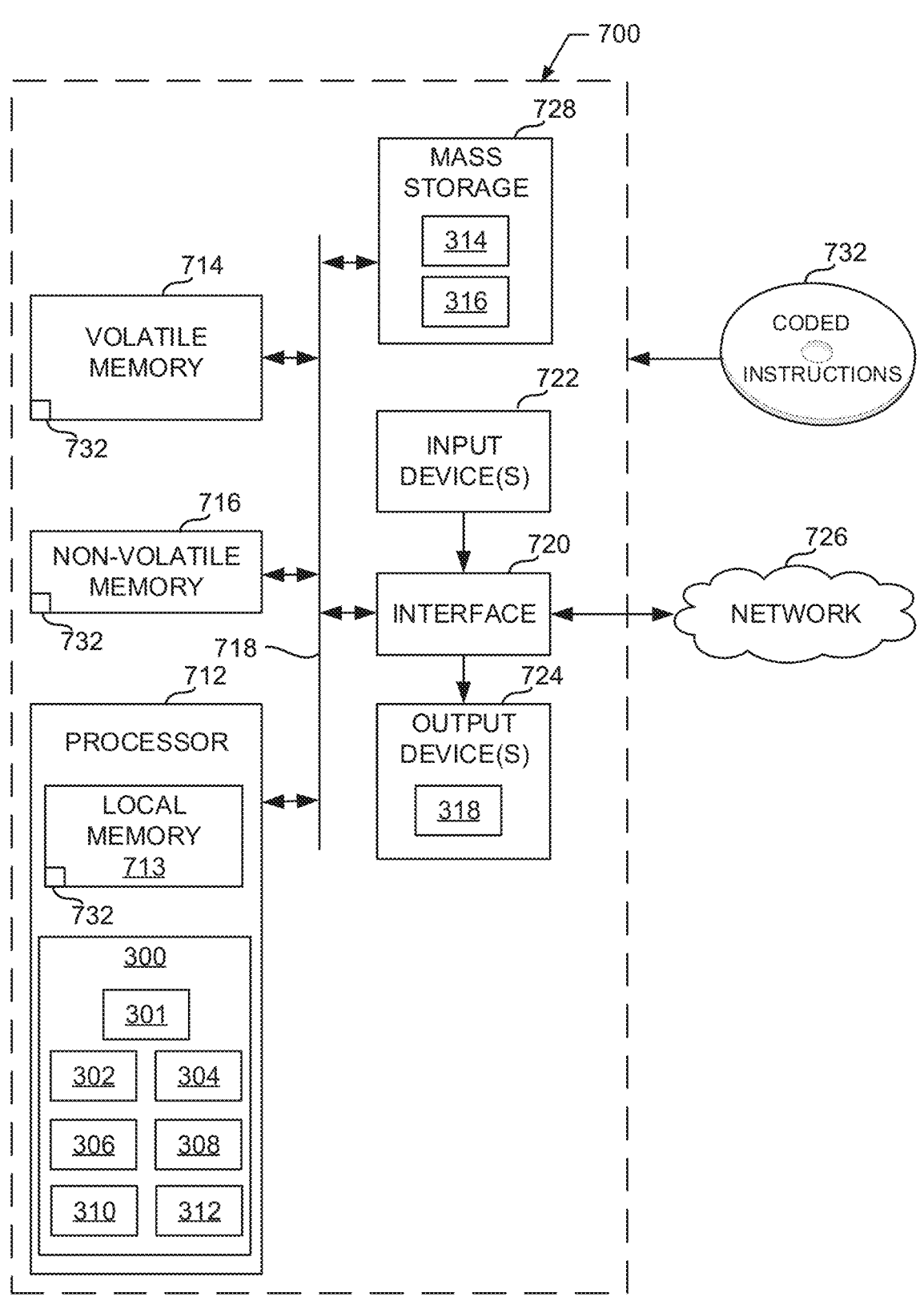
FIG. 7 is a block diagram of an example processing platform structured to execute the instructions of FIG. 5 to implement the example data analyzer of FIG. 3.

FIG. 7 is a block diagram of an example processor platform 700 structured to execute the instructions of FIG. 5 to implement a collection facility 106 including the data analyzer 300 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example audio signature comparator 301, the example code decoder 302, the example media identifier 304, the example location determiner 306, the example data corruption detector 308, the example report generator 310, the example alerter 314, and/or, more generally, the data analyzer 300.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user and/or a device to enter data and/or commands into the processor 612. The input device(s) 722 can be implemented by, for example, an audio sensor, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724, which may include the output device 318, can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In some examples, the mass storage 728 includes the signature/code database 314 and the database 316.

The machine executable instructions 732 of FIG. 5 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus, systems, and articles of manufacture have been disclosed that improve audience measurement techniques. The disclosed examples enable collection facilities to perform automated audience measurement and also improve compliance and illogical behavior results using enriched data sets from the home. The examples disclosed herein improve data accuracy and validity, thereby driving automated improvements in detection of intentionally trying to manipulate ratings system. The examples disclosed herein can also provide a communication mesh networking type solution.

Examples methods, apparatus, systems, and articles of manufacture have been disclosed for audience measurement. These and other example combinations disclosed herein include the following:

Example 1 is an audience monitoring system including a beacon to be disposed proximate a media presentation device. The beacon is to transmit a ping signal. The audience monitoring system also includes a portable metering device to be carried by a person. The portable metering device includes a microphone to receive an audio signal and a processor to determine a distance value indicative of a distance between the portable metering device and the beacon based on the ping signal.

Example 2 includes the audience monitoring system of Example 1, wherein the processor is to correlate the audio signal with the media presentation device based at least in part on the distance value.

Example 3 includes the audience monitoring system of Examples 1 or 2, wherein the processor is to determine a power level of the audio signal and correlate the audio signal with the media presentation device based at least in part on the power level.

Example 4 includes the audience monitoring system of any of Examples 1-3, wherein the beacon is a first beacon, the media presentation device is a first media presentation device, the ping signal is a first ping signal, the distance value is a first distance value, and the distance is a first distance. The audience monitoring system further includes a second beacon to be disposed proximate a second media presentation device. The second beacon is to transmit a second ping signal. The processor is to determine a second distance value indicative of a second distance between the portable metering device and the second beacon based on the second ping signal.

Example 5 includes the audience monitoring system of Example 4, wherein the processor is to determine a first power level of a first audio signal received by the microphone and a second power level of a second audio signal received by the microphone.

Example 6 includes the audience monitoring system of Example 5, wherein the processor is to correlate the first audio signal with the first media presentation device based on the first distance value being less than the second distance value and the first power level being greater than the second power level.

Example 7 includes the audience monitoring system of Example 6, wherein the portable metering device includes a wireless transceiver to transmit the correlation to a collection facility.

Example 8 includes the audience monitoring system of any of Examples 1-7, wherein the ping signal includes an identification of the beacon.

Example 9 includes the audience monitoring system of any of Examples 1-8, wherein the ping signal includes a time stamp.

Example 10 includes the audience monitoring system of any of Examples 1-9, wherein the beacon is to be physically coupled to the media presentation device.

Example 11 includes the audience monitoring system of any of Examples 1-10, wherein the beacon is integrated into the media presentation device.

Example 12 includes the audience monitoring system of any of Examples 1-11, wherein the ping signal is a return ping signal, and wherein the portable metering device includes a wireless transceiver to transmit a request ping signal. The beacon is to transmit the return ping signal in response to the request ping signal.

Example 13 is a non-transitory machine readable storage medium comprising instructions that, when executed, cause at least one processor of a portable metering device to at least: identify an audio signal received by a microphone of the portable metering device, determine a distance value indicative of a distance between the portable metering device and a beacon associated with a media presentation device, correlate the audio signal and the media presentation device based on the distance value, and cause a wireless transmitter of the portable metering device to transmit the correlation to a collection facility.

Example 14 includes the non-transitory machine readable storage medium of Example 13, wherein the instructions, when executed, cause the at least one processor to: determine a power level of the audio signal, and correlate the audio signal and the media presentation device based at least in part on the power level.

Example 15 includes the non-transitory machine readable storage medium of Examples 13 or 14, wherein the instructions, when executed, cause the at least one processor to: determine the distance value based on a ping signal from the beacon received by the wireless transmitter.

Example 16 includes the non-transitory machine readable storage medium of Example 15, wherein the ping signal includes an identification of the beacon.

Example 17 includes the non-transitory machine readable storage medium of Examples 15 or 16, wherein the ping signal is a return ping signal, and wherein the instructions, when executed, cause the at least one processor to: cause the wireless transmitter to transmit a request ping signal, the beacon to transmit the return ping signal in response to the request ping signal.

Example 18 is a portable metering device including a microphone to receive an audio signal and a processor to: determine a distance value indicative of a distance between the portable metering device and a beacon associated with a media presentation device, determine a power level of the audio signal received by the microphone, and correlate the audio signal with the media presentation device based on the distance value and the power level.

Example 19 includes the portable metering device of Example 18, further including a wireless transceiver to receive a ping signal from the beacon. The processor is to determine the distance value based on the ping signal.

Example 20 includes the portable metering device of Examples 18 or 19, further including a wireless transceiver to transmit the correlation to a collection facility.

Example 21 is a portable metering device including microphone to receive audio signals from the surrounding environment and a processor to determine a distance between the portable metering device and another device.

Example 22 is a beacon associated with a media presentation device. The beacon is to transmit a return ping signal in response to receiving a request ping signal.

Example 23 is a system including a portable metering device to be carried by a person. The portable metering device is to receive audio signals from the surrounding environment. The portable metering device is to transmit a request ping signal. The system further includes a beacon to transmit a return ping signal in response to receiving the request ping signal.

Example 24 is a method including determining a distance between a metering device and beacon of an audience measurement system.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

The following claims are hereby incorporated into this Detailed Description by this reference, with each claim standing on its own as a separate embodiment of the present disclosure.

The invention claimed is:

1. A system comprising:
a processor; and
a memory storing instructions that, when executed by the processor, cause the system to perform operations comprising:
tracking a first location of a first portable metering device associated with a first consumer and a second location of a second portable metering device associated with a second consumer over a period of time based on a plurality of distance values associated with one or more surrounding devices at a media exposure measurement location where consumers are exposed to media;
comparing the first location and the second location over the period of time; and
based on the comparison, flagging meter data obtained by the first metering device and the second metering device over the period of time as corrupted meter data for which media exposure cannot reliably be attributed to the first consumer associated with the first portable metering device and the second consumer associated with the second portable metering device.

2. The system of claim 1, wherein the first location of the first portable metering device substantially matches the second location of the second portable metering device over the period of time.

3. The system of claim 1, wherein the one or more surrounding devices comprise a beacon device disposed proximate to a media presentation device at the media exposure measurement location.

4. The system of claim 3, wherein the plurality of distance values are determined based on a ping signal transmitted by the beacon device, the ping signal comprising an identification of the beacon device.

5. The system of claim 1, wherein:
(i) the first location of the first portable metering device is determined based on a first distance value of the plurality of distance values, the first distance value indicative of a distance between the first portable metering device and a first surrounding device of the one or more surrounding devices; and
(ii) the second location of the second portable metering device is determined based on a second distance value of the plurality of distance values, the second distance value indicative of a distance between the second portable metering device and a second surrounding device of the one or more surrounding devices.

6. The system of claim 5, wherein the first surrounding device is the second portable metering device, and the second surrounding device is the first portable metering device.

7. The system of claim 5, wherein the first surrounding device and the second surrounding device are the same device.

8. The system of claim 1, wherein the operations further comprise:
generating an alert indicating that the meter data obtained by the first metering device and the second metering device over the period of time as the corrupted meter data; and
providing the alert for output on an output device.

9. A non-transitory machine readable storage medium comprising instructions that, when executed, cause a processor to perform operations comprising:
tracking a first location of a first portable metering device associated with a first consumer and a second location of a second portable metering device associated with a second consumer over a period of time based on a plurality of distance values associated with one or more surrounding devices at a media exposure measurement location where consumers are exposed to media;
comparing the first location and the second location over the period of time; and
based on the comparison, flagging meter data obtained by the first metering device and the second metering device over the period of time as corrupted meter data for which media exposure cannot reliably be attributed to the first consumer associated with the first portable metering device and the second consumer associated with the second portable metering device.

10. The non-transitory machine readable storage medium of claim 9, wherein the first location of the first portable metering device substantially matches the second location of the second portable metering device over the period of time.

11. The non-transitory machine readable storage medium of claim 9, wherein the one or more surrounding devices comprise a beacon device disposed proximate to a media presentation device at the media exposure measurement location.

12. The non-transitory machine readable storage medium of claim 11, wherein the plurality of distance values are determined based on a ping signal transmitted by the beacon device, the ping signal comprising an identification of the beacon device.

13. The non-transitory machine readable storage medium of claim 9, wherein:
(i) the first location of the first portable metering device is determined based on a first distance value of the plurality of distance values, the first distance value indicative of a distance between the first portable metering device and a first surrounding device of the one or more surrounding devices; and
(ii) the second location of the second portable metering device is determined based on a second distance value of the plurality of distance values, the second distance value indicative of a distance between the second portable metering device and a second surrounding device of the one or more surrounding devices.

14. The non-transitory machine readable storage medium of claim 13, wherein the first surrounding device is the second portable metering device, and the second surrounding device is the first portable metering device.

15. The non-transitory machine readable storage medium of claim 13, wherein the first surrounding device and the second surrounding device are the same device.

16. The non-transitory machine readable storage medium of claim 9, wherein the operations further comprise:

generating an alert indicating that the meter data obtained by the first metering device and the second metering device over the period of time as the corrupted meter data; and providing the alert for output on an output device.

17. A method comprising:

tracking a first location of a first portable metering device associated with a first consumer and a second location of a second portable metering device associated with a second consumer over a period of time based on a plurality of distance values associated with one or more surrounding devices at a media exposure measurement location where consumers are exposed to media;

comparing the first location and the second location over the period of time; and based on the comparison, flagging meter data obtained by the first metering device and the second metering device over the period of time as corrupted meter data for which media exposure cannot reliably be attributed to the first consumer associated with the first portable metering device and the second consumer associated with the second portable metering device.

18. The method of claim 17, wherein the first location of the first portable metering device substantially matches the second location of the second portable metering device over the period of time.

19. The method of claim 17, wherein the one or more surrounding devices comprise a beacon device disposed proximate to a media presentation device at the media exposure measurement location.

20. The method of claim 19, wherein the plurality of distance values are determined based on a ping signal transmitted by the beacon device, the ping signal comprising an identification of the beacon device.

* * * * *